March 19, 1946.  J. P. VAN ZANDT  2,397,063
DETERMINING GREAT CIRCLE ROUTES
Filed Oct. 4, 1943  2 Sheets-Sheet 1

Inventor
J. P. Van Zandt,
By Karl Fenning
his Attorney

March 19, 1946.  J. P. VAN ZANDT  2,397,063
DETERMINING GREAT CIRCLE ROUTES
Filed Oct. 4, 1943  2 Sheets-Sheet 2

Inventor
J. P. Van Zandt,
By Karl Truwig
his Attorney

Patented Mar. 19, 1946

2,397,063

UNITED STATES PATENT OFFICE 2,397,063

DETERMINING GREAT CIRCLE ROUTES

John Parker Van Zandt, Washington, D. C.

Application October 4, 1943, Serial No. 504,910

11 Claims. (Cl. 35—40)

The invention relates to determining the length and location of great circle routes between selected points such as cities and the like on the earth's surface.

In going by airplane from place to place, it generally is desirable to follow as nearly as possible great circles as the shortest distance between points on the earth's surface. In order to ascertain airplane routes for aviation, educational or other purposes, it is desirable to determine not merely the distance between two points but also the portions of the earth's surface over which the route is to go. It is possible to calculate by mathematics the great circle distance between two points whose latitude and longitude is known and this is a method which has been employed with satisfaction. Such a method, however, requires time and either complicated calculations or reference to intricate tables, in the use of which there may be chance for error. Such procedure, however, does not indicate the route or the location of intermediate points on the route.

It is a purpose of the present invention to ascertain the distance and location of great circle routes on the surface of the earth. The routes may be shown so as to indicate the places underlying the great circle routes. This is accomplished by simple apparatus which informs by inspection requiring substantially no calculation and allowing substantially no chance for error.

Various devices have been developed for use with a globe or spherical representation of the earth's surface but these are generally clumsy and inconvenient and frequently give relatively inaccurate results.

It has been found that a flat azimuthal projection map of the earth's surface or a portion thereof may be drawn to a suitable scale. The present invention may use such a map in combination with a transparent sheet which may overlie the map. The sheet is provided with a grid or plan of great circles arranged proportionately to the scale and nature of the map. The map and overlying sheet may be so associated that by relative movement between the two any two points may be caused to underlie a single great circle indicated on the transparent sheet or a great circle interpolated therefrom. By arranging, adjusting or pivoting the overlying sheet in a proper manner with respect to the underlying map, and then adjusting the two so that the great circle overlies the points to be investigated, the location of the great circle and its distance between the points may be readily observed.

For convenience of use, the map may be provided with the ordinary or any suitable lines indicating latitude and longitude. These may be particularly useful in locating points indicated on the map and they may also be useful in locating the position on the map of cities and the like which are not marked on the map but whose latitude and longitude may be determined from an atlas or the like. It will be understood, of course, that no map covering large surfaces of the earth's area can be in sufficient detail to show specifically all cities, villages, and the like.

The transparent sheet may have on it any suitable number of great circles which may be placed at any suitable intervals. The form and arrangement of the great circles of the transparent sheet of course will be proportionate to and correspond with the scale and character of the map with which the sheet is to be employed. Great circles on the transparent sheet may be divided into suitable units or at least have the units marked so as to aid in observing and calculating the distance between points along great circles.

In order to make a permanent or fugitive record of the location of the great circle between any two points the transparent overlying sheet may be provided with perforations through which may be inserted a pencil or other marking device which may afford spots or dashes at intervals on the map which, after the transparent sheet is removed from the area, may show the path or may be connected to indicate and record the path of the great circle route.

For convenience of reference and observation the great circles on the transparent sheet may be numbered at one or more places. There may be provided a scale at the dividing lines on the great circles, which may indicate the distances in degrees or statute miles or nautical miles or in airplane flying time on any selected basis, or all or a plurality of such scales may be provided.

It may frequently be found that the particular great circles marked on the transparent sheet are not close enough together to provide any indicated great circle which actually passes through the points or cities being investigated. It may thus be necessary to interpolate between indicated great circles. As an aid in this procedure, the division marks or some of them between great circles may, if desired, be provided with accurately and equally separated intermediate marks. For convenience in use and calculation, it may be desirable to place the great circles or the separating marks or both on a decimal scale. Thus, the divisions between adjacent great circles may be in tenths or fifths or other decimal units. Likewise the scale marks on the lengths of the great circles, if desired, may be arranged by a similar decimal system.

The invention may be applied to various types of maps but for convenience of explanation it will be described and illustrated in the accompanying drawings as applied to azimuthal equidistant projections of opposite hemispheres.

In the drawings

Figure 1:
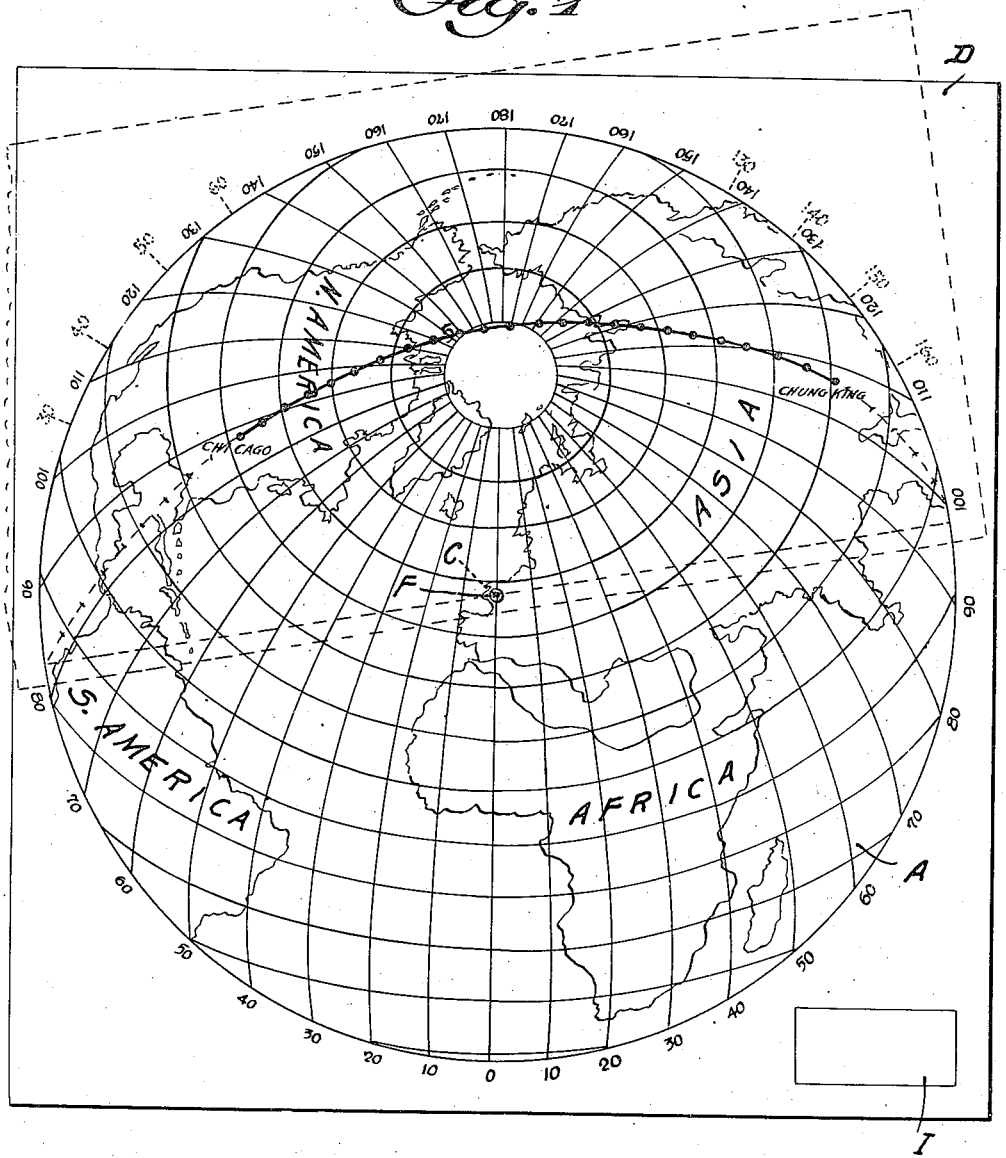
Figure 1 is a plan view of a map of one hemisphere drawn on an azimuthal equidistant projection, showing in dotted lines a superposed diagram of proportionately arranged great circles in a fragmentary manner.
Figure 3:
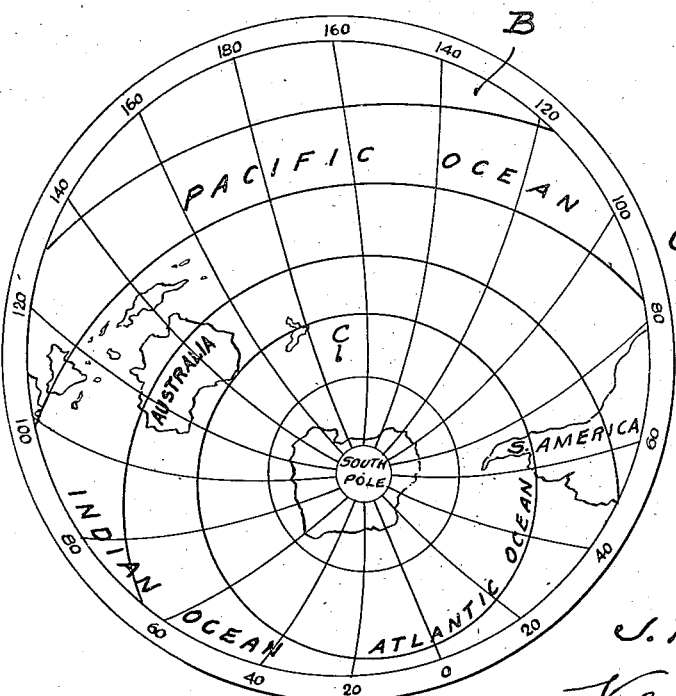
Fig. 3 is a plan view on reduced scale of a map of the opposite hemisphere, corresponding to Fig. 1.

So as not to unduly congest the drawings, the map A of Fig. 1 and the map B of Fig. 3 are made generally in outline and without any endeavor to show much detail. It will be understood, of course, that in actual use these maps may be made with as much more detail as desired, in a manner well known to cartographers. The map A, which may be referred to as the principal hemisphere, has its center or point of tangency C on Greenwich longitude and 48° North latitude, lying in France. While not essential to the present invention, the selection of such a point of tangency is a material convenience since the hemisphere so defined includes approximately 98 per cent of the world's population, approximately 91 per cent of the international trade, and approximately 88 per cent of the ice-free land area of the world. The circumference of the circle represents the horizon in such a map, and it will be understood that within this horizon lies so much of the important part of the world that most of the useful great circle routes between points on the earth's surface may be determined from this circular hemisphere map. Nevertheless, for the purpose of determining great circle routes in other parts of the world, or between points on the principal hemisphere and other points of the world, the map B of the opposite hemisphere illustrated in Fig. 3 may be resorted to.

Figure 2:
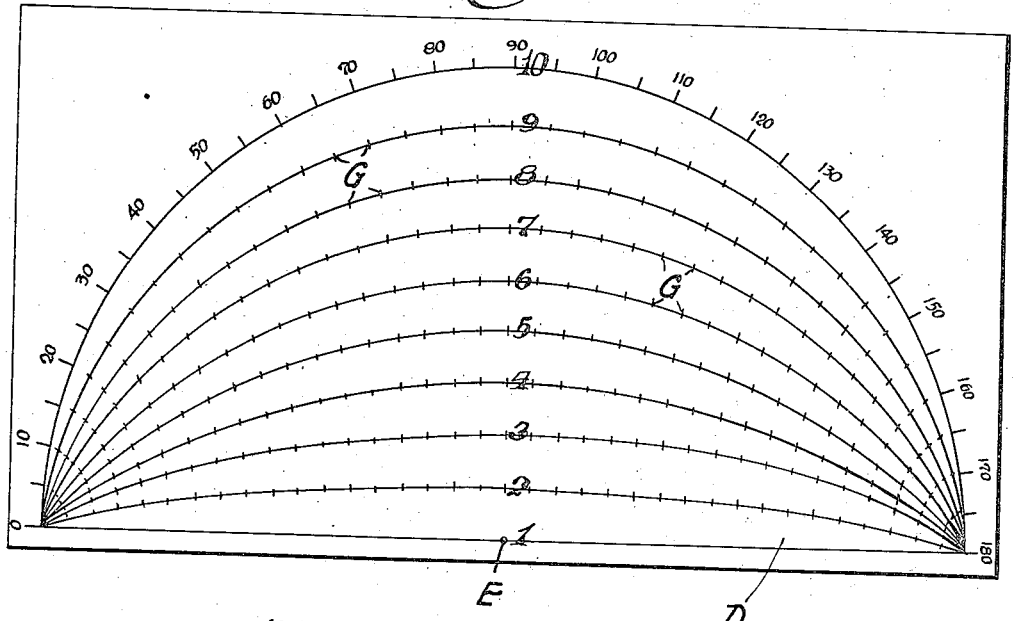
Fig. 2 is a plan view of a diagram of proportionately arranged great circles.

In Fig. 2 there is illustrated a diagram D of great circles arranged in a manner well known to cartographers to correspond with the maps A and B. It will be understood, of course, that the shape, location, scale and course of great circles will be determined by the character of the map with which the diagram is to be used and, in order to indicate this co-relation, the term "proportionately arranged great circles" is employed.

The diagram D is preferably made in any suitable way on a sheet of transparent material. This is shown rectangular but it may be convenient to cut off the upper corners so that there is a semicircular sheet to manipulate. For this purpose there may be used glass or preferably one of the transparent plastics. For purposes of greatest accuracy, it is desirable that the maps and the material of the diagram all be permanent, and non-shrinking. The number of great circles indicated on the diagram D may vary with the desires or convenience of manufacture or use. It may in general be sufficient to have a reasonable number of great circles marked and rely on interpolation between the adjacent great circles to determine intervening circles. For convenience of illustration and so as not to congest the drawings, there are illustrated in Fig. 2 ten great circles. The straight great circle or that at the diameter being numbered 1 and the succeeding great circles being numbered 2, 3, 4, 5, 6, 7, 8, 9 and 10, the latter being the circumference. These reference numerals may be applied at any suitable portions of the great circles, being indicated at approximately their centers. It may be convenient to place these or similar reference characters at various or plural points throughout the lengths of the great circles. The area covered by the great circles of course may be a complete circle or any portion thereof. It may be convenient, however, to employ only a semi-circle as indicated in Fig. 2 which, by manipulation, may be used to search the entire circular map.

Preferably, the diagram D will be provided with a perforation E at the center of its diameter or straight great circle and by means of this perforation it may be mounted on the pin F at the center C of the map. Any other suitable means may be provided for allowing the diagram D to rotate about the center C or, if desired, there may be no mechanical connection between the two, but the diagram may be suitably adjusted on the map with the point C in register with the point E.

In order to locate a great circle on the map between two points, it is necessary merely to place the chart so that its center E overlies the center C of the map in such a way that a single great circle passes through the two points to be located. Chicago, Illinois, and Chungking, China, are indicated in Fig. 1. In order to determine and locate the great circle route between these two points, it is necessary only to turn the diagram D so that a single great circle (that marked 5 in this instance) shall pass through both Chicago and Chungking. With the diagram in this position the numerical indications on the circumference of the diagram corresponding to these two cities may be read and, by subtracting the numeral corresponding to Chicago from the numeral corresponding to Chungking, the distance between the two points may be ascertained.

In Fig. 1 the diagram D is indicated in outline and in a fragmentary manner, only the great circle marked 5 on Fig. 2 being shown, so as not to make a showing of dots and lines in such abundance as to be disturbing to a clear understanding of the invention.

The cross marks G indicated on the various great circles (Fig. 2) are placed to correspond on each great circle with the numerals at the circumference of the diagram and they may represent dots or perforations through which a pencil or marker may be inserted to indicate the location of the great circle route as indicated on Fig. 1.

Figure 4:
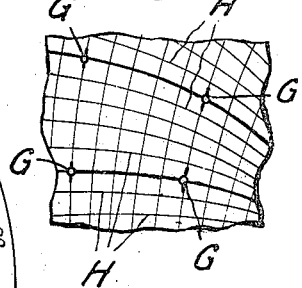
Fig. 4 is a fragmentary plan view on an enlarged scale of a section of a diagram such as shown in Fig. 2 with additional marks.

If it happens that the great circle passing through the two points under consideration does not directly lie on one of the great circles indicated on the chart, it may be necessary to interpolate. This may be done by the eye or by marking the two adjacent great circles and interpolating. It may be desirable, however, for this purpose to provide on the chart intermediate marks. This is shown in Fig. 4 where the space intermediate the markings G both along the marked great circles and between the great circles is suitably divided by a light subdivision mark H. For convenience of calculation, the markings G as well as the subdivisions H may be arranged on a decimal scale. Thus in Fig. 4 the divisions between the principal markings G are divided into fifths. This is a matter of convenience only and is not essential to the present invention.

The marking at the circumference of the diagram D may be on any suitable scale. In Fig. 2 the markings are indicated as in degrees, but the divisions and markings may be made to indicate actual miles, either nautical or statute, or, if desired, they may be arranged to indicate hours of flying at a given speed, or the like. Whatever scale is used, it may be desired to translate the direct readings into other units and for this purpose there may be provided a table, either on the map A or elsewhere or on the diagram D. There is indicated at I, on Fig. 1, a table for conversion of the readings or calculations directly from the diagram into whatever other units it may be desired to determine.

It will be understood, of course, that by adjusting the diagram D about its center E over the point of tangency C of the map A a great circle may be located connecting any two points on the map. When the map is in sufficient detail, the points between which the great circle is to be determined may be shown on the map and the chart properly adjusted to overlie them. If, however, the points between which the great circle is to be determined are not already found on the map, their latitude and longitude may be ascertained by an atlas or by any other means, and the points themselves may be marked on the map and the diagram properly shifted or adjusted to overlie them so as to determine the great circle connecting them.

A large proportion of the points which may be of interest will be included in such a map as that shown in Fig. 1. A diagram, however, may be similarly manipulated on the opposite hemisphere indicated in Fig. 3 to locate the great circles between points lying wholly within that hemisphere, it being understood, of course, that the diagram used in this hemisphere will be proportionately arranged and of a size etc. to correspond with it.

When it is desired to determine the great circle extending between a point in the principal hemisphere indicated in Fig. 1 and a second point lying in the opposite hemisphere indicated in Fig. 3, it will be necessary to manipulate diagrams on both hemispheres. Thus, if it is desired to find the great circle between some small town in Pennsylvania and a small town in Argentina, the latitude and longitude of the town in Pennsylvania may be ascertained and the location of the town marked on the map of Fig. 1. The latitude and longitude of the place in Argentina may be ascertained and its location marked on the map in Fig. 3. By inspection, it will be estimated that the great circle running from Pennsylvania to South America will go generally south, and the diagram D may be so arranged that a great circle passing through the point in Pennsylvania goes to the horizon at the point marked 60 for instance. If, for instance, in this arrangement the great circle marked 7 on the diagram passes through the town in Pennsylvania, the diagram on the map of Fig. 3 may be so arranged that the great circle marked 7 passes through the indicated point in Argentina. If in this adjustment the great circle passes through the horizon at the point marked 60 on the map of Fig. 3, it will be obvious that the great circle connecting the two points has been located. If, however, it happens that the great circle 7 on the map of Fig. 3 reaches the horizon at some other point such as the point 40, it will be clear that there must be an additional adjustment of the diagrams so that the same great circle in each hemisphere will cross the horizon at the same point. Thus the diagram may be adjusted on Fig. 1 so that the great circle (which may even be an interpolated great circle) engaging the point in Pennsylvania passes through some point between the marks 40 and 60 on the horizon of Fig. 1, and the diagram on the Fig. 3 map may be adjusted so that its corresponding great circle passes through the same point on the horizon of Fig. 3. Thus the adjustment of diagrams on the map of Fig. 1 and the map of Fig. 3 may be made until the corresponding great circles passing through the two points under consideration both pass through the same point on the horizon. With this adjustment the great circle may be marked on the map of Fig. 1 and also on the map of Fig. 3 showing its location. The length of the great circle between each point and the horizon of each map may be determined and these two distances added together to indicate the distance along the great circle between the two points.

In the drawings the maps of Fig. 1 and Fig. 3 are shown on different scales. It will be understood, however, that in actual use both hemispheres may be made on the same scale. If, however, maps of different scales are to be employed, corresponding diagrams showing proportionately arranged great circles on appropriate different scales will of course be used with the individual hemispheres. Similarly, a transparent diagram to an appropriate scale carrying proportionately arranged great circles can be used with any other hemispherical zenithal projection and similar form of projection such as stereographic, orthographic, azimuthal equal area, and the like.

While much of the advantage of the specific form illustrated may be lost, a diagram may also be used on a projection showing the entire world, where said projection is symmetrical about the point of tangency. In that case much of the simplicity and advantage of the disclosure of the drawings may be lost because of the greatly increased scale variation in the outer portion of such world maps. The simple character of the great circle as represented in the drawings is lost when a projection is used materially greater than a single hemisphere.

It will be understood that in the maps as illustrated in the drawings there will be a variation of scale between the center and the circumference in a manner understood by cartographers. One advantage, however, of the present disclosure is that the projections illustrated have a minimum of scale variation from the point of tangency to the horizon.

The actual making and arrangement of the great circle diagram may vary to suit different conveniences. For instance, each great circle may be illustrated by lines of the same character, as illustrated in Fig. 2. It may be desirable, however, to make alternate or certain of the great circles somewhat heavier or in dotted or dash lines etc. so that the tracing of a given circle may be simplified.

Various changes may be made without departing from the invention.

I claim as my invention:

1. Means for determining the great circle arc between points on a map of the earth's surface symmetrical about the central point of projection comprising a transparent diagram provided with proportionately arranged great circles one of which is straight adapted to be placed on the map with the center of the straight great circle of the diagram overlying the central point of projection, and a single great circle of the diagram overlying the first mentioned points.

2. Means for determining the great circle arc between points on a map of the earth's surface symmetrical about the central point of projection comprising a transparent diagram provided with proportionately arranged great circles one of which is straight, and means for pivoting the diagram at the center of its straight great circle at the central point of projection of the map.

3. Means for determining the great circle arc between points on an azimuthal projection of a hemisphere comprising a transparent diagram provided with proportionately arranged great circles, and means to pivot the center of the diameter of the diagram at the central point of projection of the map so that it may be turned so that a single great circle will overlie the first mentioned points.

4. Means for determining the great circle arc between points on an azimuthal projection of a hemisphere comprising a transparent diagram provided with proportionately arranged great circles provided with a reading scale, and means to pivot the center of the diameter of the diagram at the central point of projection of the map so that it may be turned so that a single great circle will overlie the first mentioned points.

5. Means for determining the great circle arc between points on an azimuthal projection of a hemisphere comprising a transparent semicircular diagram provided with proportionately arranged great circles provided with a reading scale and perforations along the great circles, and means to pivot the center of the diameter of the semicircular sheet at the central point of projection of the map so that it may be turned so that a single great circle of the diagram will overlie the first mentioned points and may be plotted on the projection.

6. Means for locating on an azimuthal projection map of a hemisphere the great circle arc extending between any two points on said map, said means comprising a transparent diagram including a straight line equal to the diameter of said map and arcs on respectively progressively decreased radii intersecting the ends of said straight line, the last of said arcs being on a radius equal to the radius of said map, such diagram being adapted to be positioned with the center of said straight line in registry with the center of said map and said map and locating means while so positioned adapted to be relatively rotated until said two points are brought into the same lateral relationship with some one of said arcs.

7. A device for indicating great circle courses between different geographical locations, said device including in combination an azimuthal map and a transparent cover that overlies at least a portion of the area of the map, arcs of different curvature marked on the cover and extending across the cover from one side toward the other, said arcs being shaped to correspond to great circle courses over the surface represented by the map, means connecting the cover and the map, said cover and map being movable with respect to one another for bringing different arcs on the cover over different portions of the map.

8. A device for indicating great circle courses between geographical locations including an azimuthal map on a sheet and a diagram sheet that coincides with at least a portion of the area of the map at least one of said sheets being transparent, arcs of different curvatures marked on the diagram sheet and extending across the diagram sheet from one side toward the other, said arcs being shaped to correspond to great circle courses over the surface represented by the map, said diagram sheet and map being movable with respect to one another for bringing different arcs on the diagram sheet into register with different portions of the map.

9. A device for indicating great circle courses between different geographical locations, including in combination an azimuthal map and a diagram in register with at least a portion of the area of the map, arcs of different curvature marked on the diagram and extending across it from one side toward the other, the arcs being shaped to correspond to great circle courses over the surface represented by the map, said map and diagram being movable with respect to one another for bringing different arcs in register with different portions of the map.

10. Means for locating on an azimuthal projection map of a hemisphere the great circle arc extending between any two points on said map, said means comprising a diagram including a straight line equal to the diameter of said map and arcs on respectively progressively decreased radii intersecting the ends of said straight line, the last of said arcs being on a radius equal to the radius of the map; the diagram being adapted to be positioned with the center of the straight line in registry with the center of the map and the map and locating means while so positioned adapted to be relatively rotated until said two points are brought into the same lateral relationship with some one of said arcs.

11. Means for determining great circle arcs between points on a map on the earth's surface symmetrical about the central point of projection comprising a diagram provided with proportionately arranged great circles one of which is straight adapted to be placed in registry with the map with the center of the straight great circle in registry with the central point of projection, and a single great circle in approximate registry with the first mentioned points.

JOHN PARKER VAN ZANDT.